United States Patent
Mokhinuddeen et al.

(10) Patent No.: US 10,284,569 B2
(45) Date of Patent: May 7, 2019

(54) EMAIL BASED SLAS MANAGEMENT FOR EFFECTIVE BUSINESS

(71) Applicant: CA, Inc., New York, NY (US)

(72) Inventors: Shaik Mokhinuddeen, Hyderabad (IN); Surya Kiran Satyavarapu, Hyderabad (IN); Gowtham Sen Potnuru, Hyderabad (IN)

(73) Assignee: CA, Inc., New York, NY (US)

( * ) Notice: Subject to any disclaimer, the term of this patent is extended or adjusted under 35 U.S.C. 154(b) by 181 days.

(21) Appl. No.: 15/391,168

(22) Filed: Dec. 27, 2016

(65) Prior Publication Data
US 2018/0183811 A1   Jun. 28, 2018

(51) Int. Cl.
H04L 29/06   (2006.01)

(52) U.S. Cl.
CPC ........ H04L 63/123 (2013.01); H04L 63/0892 (2013.01)

(58) Field of Classification Search
None
See application file for complete search history.

(56) References Cited

U.S. PATENT DOCUMENTS

| | | | | |
|---|---|---|---|---|
| 6,393,464 B1 * | 5/2002 | Dieterman | ........... | G06Q 10/107 709/206 |
| 6,981,023 B1 * | 12/2005 | Hamilton | .......... | H04L 29/12009 709/206 |
| 2004/0064734 A1 * | 4/2004 | Ehrlich | ................... | H04L 51/12 726/30 |
| 2005/0050152 A1 * | 3/2005 | Penner | .................... | H04L 51/04 709/207 |
| 2005/0198170 A1 * | 9/2005 | LeMay | ................. | H04L 63/045 709/206 |
| 2007/0005713 A1 * | 1/2007 | LeVasseur | ............ | H04L 63/126 709/206 |
| 2008/0086640 A1 * | 4/2008 | Voss | ........................ | H04L 51/00 713/171 |
| 2008/0256201 A1 * | 10/2008 | Flowers | ................. | H04L 51/28 709/206 |
| 2009/0132662 A1 * | 5/2009 | Sheridan | .............. | G06Q 10/107 709/206 |

(Continued)

OTHER PUBLICATIONS

Zhang, Zhikun et al. An Extended Permission-Based Delegation Authorization Model. 2008 International Conference on Computer Science and Software Engineering. https://ieeexplore.ieee.org/stamp/stamp.jsp?tp=&arnumber=4722438 (Year: 2008).*

(Continued)

*Primary Examiner* — Jeremiah L Avery
(74) *Attorney, Agent, or Firm* — Baker Botts L.L.P.

(57) ABSTRACT

A method includes determining that a message sent using a sender account to a first user account of an email application is unopened for a first predetermined amount of time. The method further includes, in response to determining that the message is unopened for the first predetermined amount of time, transmitting the message to a second user account on a predetermined escalation list, wherein the predetermined escalation list is configured using the sender account prior to sending the message to the first user account. The method further includes restricting the first user account from performing an action associated with the message.

20 Claims, 4 Drawing Sheets

(56) References Cited

U.S. PATENT DOCUMENTS

| | | | | |
|---|---|---|---|---|
| 2012/0324547 A1* | 12/2012 | Vidal | ............... | H04L 51/12 |
| | | | | 726/4 |
| 2014/0310365 A1* | 10/2014 | Sample | ............ | H04L 51/16 |
| | | | | 709/206 |
| 2016/0149848 A1* | 5/2016 | Vembu | ............... | H04L 51/16 |
| | | | | 709/206 |
| 2016/0269440 A1* | 9/2016 | Hartman | ......... | H04L 63/1483 |

OTHER PUBLICATIONS

Yamaguchi, Takuto et al. Integrated Access Permission: Secure and Simple Policy Description by Integration of File Access Vector Permission. 2008 International Conference on Information Security and Assurance (isa 2008). https://ieeexplore.ieee.org/stamp/stamp.jsp?tp=&arnumber=4511531 (Year: 2008).*

Chung, Boheung et al. Dynamic permission re-enforcement technique for protecting application from others with over-privileged permission at run time. 2015 8th International Conference on Security Technology (SecTech). https://ieeexplore.ieee.org/stamp/stamp.jsp?tp=&arnumber=7433841 (Year: 2015).*

* cited by examiner

EMAIL BASED SLAS MANAGEMENT FOR EFFECTIVE BUSINESS

BACKGROUND

The present disclosure relates to the exchange of funds, and, more specifically, to systems and methods for an on-demand cash network in which account-holders fulfill transaction requests from other account-holders.

E-mail is a crucial tool in today's business world. E-mail applications serve as a central hub to exchange digital messages between employees and contacts in business channels across the vast majority of industries. However, e-mail applications such as e-mail clients or e-mail web clients have, over time, become stereotypical in their offerings. Today's e-mail systems are based on a store-and-forward model, in which an email system accepts a message, stores it, and forwards it on elsewhere with the assistance of a mail server.

Further, most e-mail applications provide a basic framework of features to users. These features often include alerts, calendar functions, and fundamental correspondence. Systems and methods described herein may determine that a message sent using a sender account to a first user account of an email application is unopened for a first predetermined amount of time. The present disclosure further describes systems and methods that may in response to determining that the message is unopened for the first predetermined amount of time, transmit the message to a second user account on a predetermined escalation list, wherein the predetermined escalation list is configured using the sender account prior to sending the message to the first user account. Systems and methods disclosed herein may also restrict the first user account from performing an action associated with the message.

BRIEF SUMMARY

According to an aspect of the present disclosure, a method may include several processes. In particular, the method may include determining that a message sent using a sender account to a first user account of an email application is unopened for a first predetermined amount of time. The method may also include, in response to determining that the message is unopened for the first predetermined amount of time, transmitting the message to a second user account on a predetermined escalation list, wherein the predetermined escalation list is configured using the sender account prior to sending the message to the first user account. The method may further include restricting the first user account from performing an action associated with the message.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, different activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to email systems, systems and methods disclosed herein may be related to any field involving correspondence or communication. Moreover, certain examples disclosed herein may be described with respect to consumer or business solutions, or any other field that may involve communication. Certain embodiments described in the present disclosure are merely provided as example implementations of the processes described herein.

Email applications strive to provide users with useful features to enhance communications with contacts. However, email applications tend to offer nothing more than basic features like calendar appointments, sending messages, attaching files, and receiving messages. As a result, users today often lack useful tools that may help them efficiently communicate.

Systems and methods disclosed herein aim to increase efficient communications by providing a system that can escalate messages of high importance to users designated using a sending account. Systems and methods disclosed herein may determine that a message sent using a sender account to a first user account of an email application is unopened for a first predetermined amount of time. Further, systems and methods disclosed herein may, in response to determining that the message is unopened for the first predetermined amount of time, transmit the message to a second user account on a predetermined escalation list, wherein the predetermined escalation list is configured using the sender account prior to sending the message to the first user account. Systems and methods disclosed herein may also restrict the first user account from performing an action associated with the message.

The teachings of the present disclosure may reference specific example "device." For example, a "device" may refer to a smartphone, tablet, desktop computer, laptop, Global Positioning System (GPS) device, satellite communication terminal, radio communication terminal, or any other device capable of communications. For example, a mobile device may be equipped with an application capable of communicating with an email system. Any device with such capabilities is contemplated within the scope of the present disclosure.

In a first example, systems and methods disclosed herein may determine, using one or more processors, that a message sent using a sender account to a first user account of an email application is unopened for a first predetermined amount of time. Systems and methods disclosed herein may further, in response to determining that the message is unopened for the first predetermined amount of time, transmit the message to a second user account on a predetermined escalation list, wherein the predetermined escalation list is configured using the sender account prior to sending the message to the first user account. Systems and methods may further restrict the first user account from performing an action associated with the message.

In a second example, systems and methods disclosed herein may determine that a message sent using a sender account to a first user account of an email application is unanswered for a first predetermined amount of time. Further, systems and methods disclosed herein may, in response to determining that the message is unanswered for the first predetermined amount of time, transmit the message to a second user account of the email application on a predetermined escalation list, wherein the predetermined escalation list is configured using the sender account prior to sending the message to the first user account. In addition, systems and methods disclosed herein may restrict the first user account from performing an action associated with the message.

In a third example, systems and methods disclosed herein may determine that a first user account of an email application has not performed an action associated with a message for a first predetermined amount of time, wherein the first predetermined amount of time is configured using a sender account prior to sending the message to the first user account. Systems and methods disclosed herein may further, in response to determining that the first user account has not performed the action associated with the message for the first predetermined amount of time, transmit the message to a second user account of the email application on a predetermined escalation list, wherein the predetermined escalation list is configured using the sender account prior to sending the message to the first user account. In addition, systems and methods disclosed herein may authorize the second user account for a second predetermined amount of time to send a response to the message in the email application, wherein the second predetermined amount of time is configured using the sender account prior to sending the message to the first user account.

Figure 1:
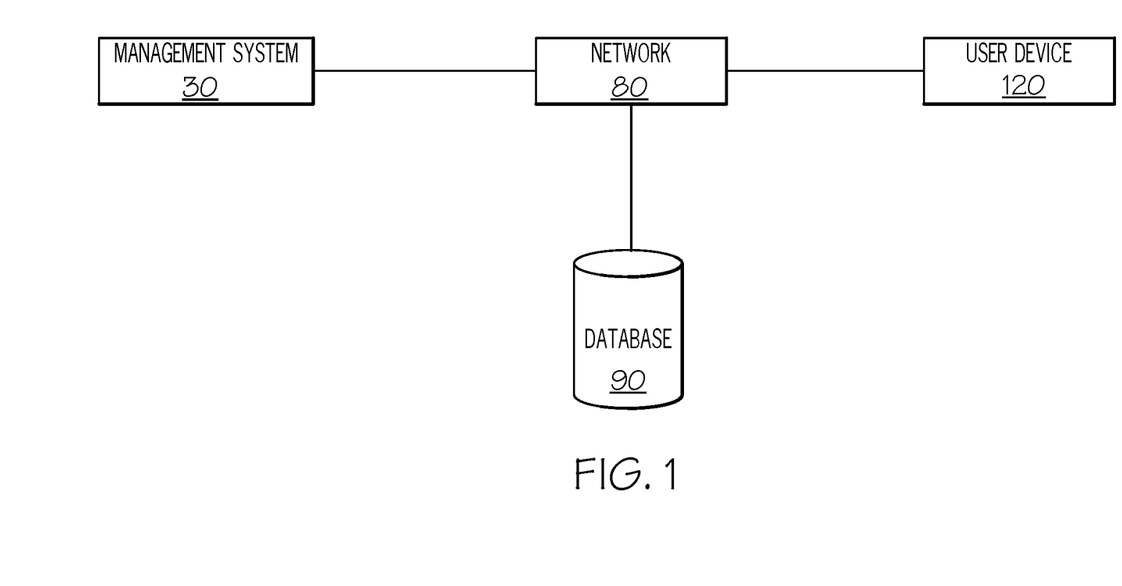
FIG. 1 is a schematic representation of a management system ecosystem of a non-limiting embodiment of the present disclosure.

FIG. 1 is a schematic representation of a management system ecosystem of a non-limiting embodiment of the present disclosure. A management system 30 may communicate with a database 90 and user device 120 via a network 80. Further, management system 30 may communicate with a local database 95. In some non-limiting embodiments of the present disclosure, management system 30 may directly communicate with user device 120 if management system 30 is installed on the user device 120. User device 120 may be a mobile device with an email application capable of communicating with management system 30. In some non-limiting embodiments, management system 30 may be installed on the user device 120 as, for example, a plug-in.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed and/or private network/cloud in certain configurations, and an open network/cloud in other configurations. Network 80 may facilitate wired or wireless communications of information and provisioning of services among users that are connected to network 80.

Network 80 may comprise one or more clouds, which may be public clouds, private clouds, or community clouds. Each cloud may permit the exchange of information and the provisioning of services among devices and/or applications that are connected to such clouds. Network 80 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 80 may be a closed, private network, an open network, or some combination thereof and may facilitate wired or wireless communications of information among devices and/or applications connected thereto.

Network 80 may include a plurality of devices, which may be physical devices, virtual devices (e.g., applications running on physical devices that function similarly to one or more physical device), or some combination thereof. The devices within network 80 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

In some non-limiting embodiments of the present disclosure, user device 120 may be any type of computer such as, for example, a desktop computer. In other non-limiting embodiments, user device 120 may be a mobile device such as a mobile phone, laptop, tablet, any portable device, etc. Mobile electronic devices may be part of a communication network such as a local area network, wide area network, cellular network, the Internet, or any other suitable network. Mobile devices may be powered by a mobile operating system, such as Apple Inc.'s iOS® mobile operating system or Google Inc.'s Android® mobile operating system, for example. A mobile electronic device may use a communication network to communicate with other electronic devices, for example, to access remotely-stored data, access remote processing power, access remote displays, provide locally-stored data, provide local processing power, or provide access to local displays. For example, networks may provide communication paths and links to servers, which may host email applications, content, and services that may be accessed or utilized by users via mobile electronic devices. The content may include text, video data, audio data, user settings or other types of data. Networks may use any suitable communication protocol or technology to facilitate communication between mobile electronic devices, such as, for example, BLUETOOTH, IEEE WI-FI (802.11a/b/g/n/ac), or Transmission Control Protocol/Internet Protocol (TCP/IP).

In some non-limiting embodiments management system 30 may use network 80 to communicate with a user device 120. In other non-limiting embodiments of the present disclosure, management system 30 may be installed in parallel with an email application on the user device 120. Management system 30 may be fully installed on the user device 120 and work in tandem with an email application on the user device 120. In some non-limiting embodiments of the present disclosure, management system 30 may support communications between the user device 120 and another device.

The management system 30 environment may also include a database 90. Database 90 may include, for example, additional servers, data storage, and resources. Management system 30 may receive from database 90 additional data, account information, correspondence history and preferences, contact information, or any data used by management system 30. Database 90 may be any conventional database or data infrastructure. For example, database 90 may include scaled out data architectures (i.e., Apache Hadoop) and/or persistent, immutable stores/logging systems.

Figure 2:
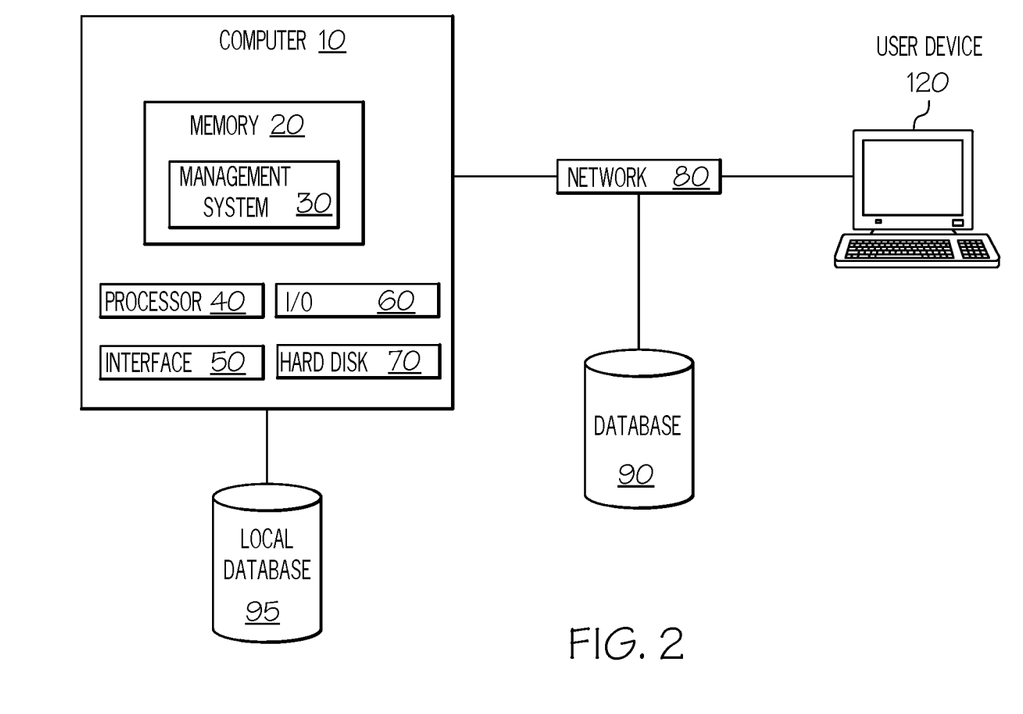
FIG. 2 is a schematic representation of a management system configured to interact with the management system ecosystem.

Referring to FIG. 2, the management system 30 of a non-limiting embodiment of the present disclosure is displayed. Computer 10 may reside on one or more networks. In some non-limiting embodiments, computer 10 may be located on any device that may receive input from a device, such as, for example, a mobile device or user device 120. Computer 10 may comprise a memory 20, a central processing unit, an input and output ("I/O") device 60, a processor 40, an interface 50, and a hard disk 70. Memory 20 may store computer-readable instructions that may instruct computer 10 to perform certain processes. In particular, memory 20 may store a plurality of application programs that are under development. Memory 20 also may store a plurality of scripts that include one or more testing processes for evaluation of applications or input. When computer-readable instructions, such as an application program or a script, are executed by the CPU, the computer-readable instructions stored in memory 20 may instruct the CPU or management system 30 to perform a plurality of functions. Examples of such functions are described below with respect to FIGS. 3-4.

In some non-limiting embodiments of the present disclosure, the CPU may be management system 30. In some implementations, when computer-readable instructions, such as an application program or a script, are executed by the CPU, the computer-readable instructions stored in memory 20 may instruct the management system 30 to interact with an email application. Computer 10 may be located on the user device 120, on a remote server, on the cloud, or any combination thereof. In some non-limiting embodiments, Computer 10 and management system 30 may communicate with user device 120 via network 80. In some non-limiting embodiments, management system 30 may interact with an email application on the computer 10 to communicate with other devices, such as user device 120.

I/O device 60 may receive data from network 80, database 90, local database 95, data from other devices and sensors connected to management system 30, and input from a user and provide such information to the management system 30. I/O device 60 may transmit data to network 80, database 90, and/or local database 95. I/O device 60 may transmit data to other devices connected to management system 30, and may transmit information to a user (e.g., display the information, send an e-mail, make a sound) or transmit information formatted for display on a user device 120 or any other device associated with the user. Further, I/O device 60 may implement one or more of wireless and wired communication between user device 120 or management system 30 and other devices within or external to network 80. I/O device 60 may receive one or more of data from another server or a network 80. The management system 30 may be a processing system, a server, a plurality of servers, or any combination thereof. In addition, I/O device 60 may communicate received input or data from user device 120 to management system 30.

Management system 30 may be located on the cloud, on an external network, on user device 120, or any combination thereof. Management system 30 may be SaaS or entirely located on the user device 120. Furthermore, some non-limiting configurations of management system 30 may be located exclusively on a user device 120, such as, for example, a mobile device or tablet. Management system 30 may also be accessed and configured by a user on user device 120 or any other graphical user interface with access to management system 30. In some non-limiting embodiments, the user may connect to network 80 to access management system 30 using the user device 120.

Further referring to FIG. 2, in some non-limiting embodiments of the present disclosure, a mobile application may be installed on the user device 120. The mobile application may facilitate communication with management system 30, database 90, local database 95, an email application on user device 120, or any other entity. In some non-limiting embodiments, a program on user device 120 may track, record, and report input information to the management system 30, such as, for example, past email interactions, escalation lists, user configurations, and corresponding data. In systems and methods of the present disclosure, such as when the management system 30 is located on user device 120, user device 120 may not be connected to network 80 while in communication with management system 30.

In some non-limiting embodiments, user device 120 may store data, user preferences and configurations, and any other data associated with the management system 30 locally on the user device 120. In some non-limiting embodiments of the present disclosure, an application on the user device 120 may communicate with management system 30 to manage analysis, data, and corresponding user input or requests on the user device 120. User device 120 may have a user interface for the user to communicate with management system 30. An application on the user device 120 and management system 30 may maintain an offline copy of all information. In some non-limiting embodiments of the present disclosure, in which the management system 30 is located partially or completely on user device 120, management system 30 may facilitate communications regarding email communications with other devices. Management system 30 may also facilitate communications between users via SMS protocol, messaging applications on any device, or any other application used for communication. Management system 30 may rely on information stored locally on user device 120. User may store communication preferences, such as a preferred escalation list, on the user device 120. In some systems and methods of the present disclosure, management system 30 may rely on information such as user preferences and configurations in a cloud database.

Management system 30 may also track and store data regarding user communications. For example, management system 30 may track and store communications between users. In some non-limiting embodiments, management system 30 may monitor response times of users on an escalation list. Management system 30 may provide a ranking list of all users in an enterprise or custom group based on responsiveness during escalation of an email message. Management system 30 may track and store statistics on any user including the timeliness in which messages are opened, the timeliness and occurrence of any reply message, the occurrence of reminders, the use and effectiveness of escalation lists, and any other information described or illustrated in the present disclosure. Data may be stored on local database 95, database 90, on computer 10, on user device 120, in the cloud, or in any other manner.

Management system 30 may determine whether a message associated with an email account would be likely to receive a reply based on tracking, status, and/or activity data. For example, in some non-limiting embodiments, management system 30 may determine that a receiving user has not opened an email application, read an email message, or replied to an email message for a predetermined amount of time. Management system 30 may determine the activity level of a user and adjust configured settings on the fly. Management system 30 may determine that a user has been inactive for a certain amount of time, and thus the predetermined amount of time allotted for this user may be adjusted. In some non-limiting embodiments, management system 30 may be configured to pass over inactive users on the escalation list in order to get the message to an active user who is able and likely to perform an action. Management system 30 may also display in the email application the current activity level of the recipient and the accounts on the escalation list. A sending account may then configure the management system 30 using this information. Further, a sending account may configure the management system 30 to adjust predetermined amounts of time based on the activity level of user accounts, including, for example, the recipient account and other user accounts on the escalation list.

In some non-limiting embodiments, management system 30 may be able to determine the location of a user based on information on the user's device, such as, for example, the user's IP address. For example, a predetermined amount of time for an action to be performed may be based on a user's location determined by an IP address. In some non-limiting embodiments, the management system 30 may determine that a receiving user is 'out of office' or inactive even though the receiving user has not provided such an indication in the email application. In some cases, an out of office response may be automated by a receiving user. Management system 30 may provide a notification to a sending user indicating the status of the receiving user prior to sending a message to the receiving user. In some non-limiting embodiments, this notification may occur in response to the sending user entering the receiving user's email address into a message. Management system 30 may also determine is a receiving user is active or inactive on a computer using context data or recent activity information on the computer of the receiving user. If seeking a prompt response, a sending user may use this information to determine whether to send the message to a different receiving user who is more active in the email application, as may be determined by the management system 30. Management system 30 may be configured to bypass the predetermined time set using the sender account in response to receiving an out of office reply or determining that a user is inactive. In other words, upon receiving an out of office reply from the receiving user, management system 30 may be configured to automatically forward the original message to a user account on an escalation list before the preset predetermined amount of time has expired.

Figure 3:
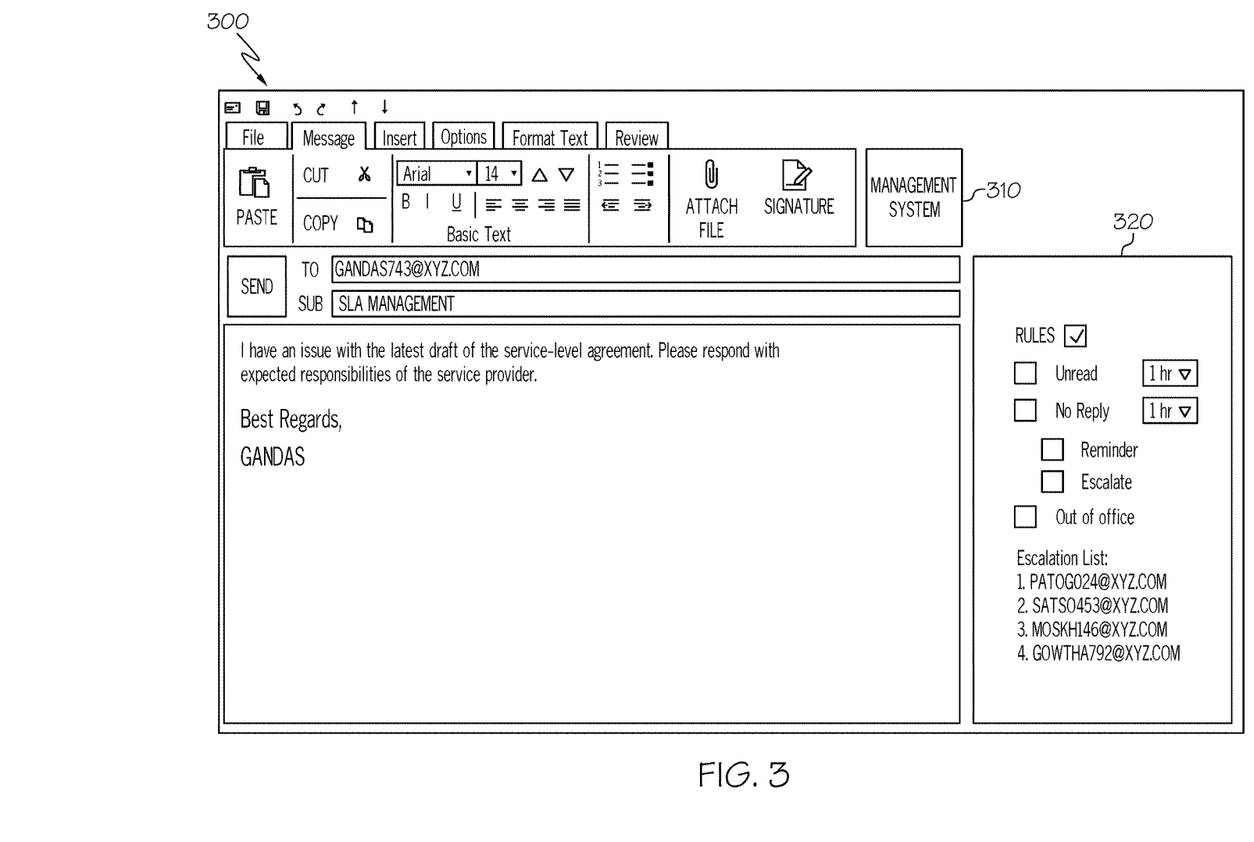
FIG. 3 illustrates a management system toolbar according to a non-limiting embodiment of the present disclosure.

FIG. 3 illustrates a management system toolbar according to a non-limiting embodiment of the present disclosure. Email application 300 may include a management system button 300 to enable management system 30. A user may configure a message in email application 300 using features provided in management system toolbar 320. In some non-limiting embodiments, management system 30 may be a plug-in for email application 300. A user may also bypass the management system toolbar by marking a message as low priority. On the other hand, a user may mark a message as high priority, thereby enacting the management system 30. In some non-limiting embodiments, a user may have previously configured the management system 30 and corresponding escalation list for all high priority messages so that when the user marks a message as high priority, the user's preferred settings are enabled for the message.

Management system 30 may enable a user to customize a contingency plan should an email satisfy a predetermined condition within a predetermined amount of time. A sending user may customize rules for a current message using management system toolbar 320. For example, a sending user may choose from several actions, which may be automatically implemented, should an email not be read or replied to within a customized timeframe. Management system toolbar 320 enables a sending user to select an action in response to an unmet condition. The unmet condition may be a sent message going unread for a predetermined amount of time, not receiving a reply for a predetermined amount of time, receiving an out of office reply, if the message is deleted by the receiving user, management system 30 determining that the user is unresponsive during a predetermined time, the receiving user having a calendar appointment conflicting with the predetermined amount of time, and/or in response to an indication from a receiving user that they lack the bandwidth or ability to read or respond to emails at the present time.

Prior to sending a message, the sending user may select from several actions listed in the management system toolbar 320 to initiate upon satisfying one of several conditions configured by the sending user. For example, a sending user may indicate in the management system toolbar 320 that should the message go unread for one hour after sending, a reminder is automatically sent to the recipient. In another example, a sending user may indicate in the management system toolbar 320 that should the message not receive a reply within one hour after sending, a reminder is automatically be sent to the recipient. Actions may further include any operation that may be completed on a computer, such as, for example, editing a document, scheduling a calendar appointment, communicating with a third party, completing a task, etc.

The management system 30 may enable the email application to perform actions automatically according to configurations of the sending user. In some non-limiting embodiments, the management system 30 may, upon meeting a condition set by the sending user, initiate a reminder notification to the recipient, initiate a resending of the original message, initiate a calendar or schedule indication of when the condition will be met and the action that will take place, initiate an escalation list configured by the sending user, or any other actions described in the present disclosure.

In some non-limiting embodiments, management system 30 may notify the recipient of the action configured to occur if the recipient fails to take an action associated with the message received from the sending user. For example, management system 30 may notify the recipient that if the configured condition is not met within fifteen minutes, the configured action will be implemented. In some non-limiting embodiments, a recipient may extend the predetermined time set by the sending user for the recipient to perform an action. A predetermined amount of time may vary according to the responsive action. For example, a recipient may have a short predetermined amount of time when the action is opening/viewing the message, but a longer predetermined amount of time when the action is responding to the message. In some non-limiting embodiments, the receiving user may be required to send an explanation and an extension request to the sending user to receive approval. In some non-limiting embodiments, the sending user may configure or change the conditions and corresponding actions after an email message is sent to a receiving user.

In some non-limiting embodiments, the sending user may configure an escalation list to be initiated should the receiving user fail to meet the preset conditions or take an action configured prior to sending the message. The sending user may indicate a list of a plurality of users that may be notified automatically should the configured condition be triggered. The users may have accounts with different email applications. In some non-limiting embodiments, the list of users may be notified in series, and in other non-limiting embodiments the list of users may all be notified at the same time. In some non-limiting embodiments, a user on the escalation list may be granted authority to perform an action regarding the message for a predetermined amount of time. Upon expiration of the predetermined amount of time, the next user on the escalation list may be granted authority to perform the action regarding the message. The predetermined amount of time may be configured based on the action. In some non-limiting embodiments, the sending user may configure the predetermined amount of time prior to sending the message.

Figure 4:
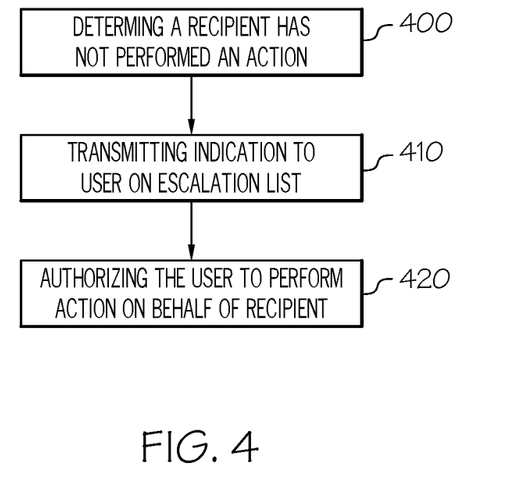
FIG. 4 is a flow chart for a method for escalating a user action according to a non-limiting embodiment of the present disclosure.

FIG. 4 is a flow chart for a method for escalating a user action according to a non-limiting embodiment of the present disclosure. In step 400, management system 30 may determine whether an action associated with a message has been performed. The message may be sent using a sender account to a recipient account of an email application. Further, management system 30 may determine whether the action has been performed during a first predetermined amount of time. In some non-limiting embodiments, the first predetermined amount of time may be configured by a sender prior to sending the message. The action may be opening the message, responding to the message, setting up a calendar appointment, editing a file or document, or any other action described in the present disclosure.

In response to determining that an action associated with the message is not performed within the first predetermined amount of time, management system 30 may transmit an indication to a second user account. The second user account may be one of the user accounts on a predetermined escalation list, as depicted in step 410. The indication may be a notification, or simply the message itself. In some non-limiting embodiments, prior to transmitting the message to the second user account, management system 30 may transmit a reminder message to the recipient account that the action associated with the message has not been performed during the first predetermined amount of time. The predetermined escalation list may be configured using a sender account prior to sending the message. In some non-limiting embodiments, the predetermined escalation list may include a plurality of user accounts of the email application.

In some non-limiting embodiments, the escalation list may be determined based on past recipients or prior escalation lists of the sender account. The sender account may also customize escalation lists based on subject matter, projects, corresponding calendar schedules or appointments, prior correspondence frequency, etc. Escalation lists may also be determined based on characteristics of the recipient account of the message. For example, an escalation list may be automatically determined based on accounts that most frequently correspond with the recipient account or the sender account. In some non-limiting embodiments, the escalation list may be determined based on the physical location proximity of account users to the location of the user of the recipient or sender account.

In step 420, management system 30 may authorize the second user account for a second predetermined amount of time to perform an action associated with the message. Management system may also restrict a recipient account or a first user account from performing the action associated with the message. The action associated with the message may be sending a response to the message in the email application. The action may include editing or manipulating a document or spreadsheet. The action may include completing a survey or any kind of communication from the second user account. In some non-limiting embodiments, management system 30 may determine that the action has not been performed by the second user account within the second predetermined amount of time. A second user account may actively indicate to the management system 30 that he or she will not perform the action within the second predetermined amount of time. In some non-limiting embodiments, the first predetermined amount of time and second predetermined amount of time may be configured by a sender prior to sending the message to the first recipient. Any predetermined time mentioned in the present disclosure may be determined based on the recipient account. In some non-limiting embodiments, predetermined times may be determined based on statistics or trends in response time associated with recipient accounts. Predetermined times may be varied using a sender account prior to sending the original message. In some non-limiting embodiments, predetermined times may be equal or varied across all accounts on the escalation list.

In response to determining that the action has not been performed within the second predetermined amount of time, management system 30 may transmit the message to a third user account. The third user account may be one of the accounts on the predetermined escalation list. Further, in some non-limiting embodiments, management system 30 may authorize the third user account to perform the action for the second predetermined amount of time. Management system 30 may also concurrently restrict the second user account from performing the action associated with the message. Management system 30 may continue through the escalation list in this manner. Management system 30 may update the sending account upon each action mentioned in the present disclosure. In some non-limiting embodiments, each user account granted authorization to perform an action may retain the authorization after expiration of the associated predetermined time. In some non-limiting embodiments, an email group of the email application may include the sending account, the recipient account, the second user account, and/or the third user account.

The flowcharts and diagrams in FIGS. 1-4 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method, comprising:
   determining, using one or more processors, that a message sent using a sender account to a first user account of an email application is unopened for a first predetermined amount of time; and
   in response to determining that the message is unopened for the first predetermined amount of time:
      transmitting the message to a second user account on a predetermined escalation list, wherein the predetermined escalation list is configured using the sender account prior to sending the message to the first user account; and
      restricting the first user account from performing an action associated with the message.

2. The method of claim 1, further comprising, in response to determining that the message is unopened for the first predetermined amount of time:
   authorizing the second user account for a second predetermined amount of time to perform the action associated with the message.

3. The method of claim 2, further comprising:
   determining that the action has not been performed by the second user account within the second predetermined amount of time; and
   in response to determining that the action has not been performed within the second predetermined amount of time:
      transmitting the message to a third user account on the predetermined escalation list;
      restricting the second user account from performing the action associated with the message; and
      authorizing the third user account to perform the action for the second predetermined amount of time.

4. The method of claim 1, wherein the action associated with the message is configured using the sender account prior to sending the message to the first user account.

5. The method of claim 1, wherein the first predetermined amount of time and the second predetermined amount of time are configured using the sender account prior to sending the message to the first user account.

6. The method of claim 2, further comprising:
   receiving an automated out of office reply from the second user account;
   in response to receiving the automated out of office reply from the second user account:
      transmitting the message to a third user account on the predetermined escalation list;
      restricting the second user account from performing the action associated with the message; and
      authorizing the third user account to perform the action for the second predetermined amount of time.

7. The method of claim 1, wherein the action associated with the message comprises sending a response in the email application to the message sent using the sender account to the first user account.

8. The method of claim 1, wherein the first predetermined amount of time is determined based on an IP address of the first user account.

9. The method of claim 1, wherein the predetermined escalation list comprises a plurality of user accounts of the email application.

10. The method of claim 2, wherein the second predetermined amount of time is determined based on an activity status of the second user account in the email application.

11. The method of claim 1, further comprising, prior to transmitting the message to the second user account:
   transmitting a reminder message to the first user account that the message is unopened for the first predetermined amount of time.

12. The method of claim 1, wherein the predetermined escalation list is determined based on a respective amount of time that it took past recipients to respond to messages received from the sender account.

13. A computer configured to access a storage device, the computer comprising:
   a processor; and
   a non-transitory, computer-readable storage medium storing computer-readable instructions that when executed by the processor cause the computer to perform:
      determining that a message sent using a sender account to a first user account of an email application is unanswered for a first predetermined amount of time; and
      in response to determining that the message is unanswered for the first predetermined amount of time:
         transmitting the message to a second user account of the email application on a predetermined escalation list, wherein the predetermined escalation list is configured using the sender account prior to sending the message to the first user account; and
         restricting the first user account from performing an action associated with the message.

14. The computer of claim 13, wherein the computer-readable instructions further cause the computer to perform, in response to determining that the message is unopened for the first predetermined amount of time:
   authorizing the second user account for a second predetermined amount of time to perform the action associated with the message.

15. The computer of claim 13, wherein the computer-readable instructions further cause the computer to perform:
   determining that the action is not performed by the second user account within the second predetermined amount of time; and
   in response to determining that the action is not performed within the second predetermined amount of time:
      transmitting the message to a third user account on the predetermined escalation list;
      restricting the second user account from performing the action associated with the message; and
      authorizing the third user account to perform the action for the second predetermined amount of time.

16. The computer of claim 13, wherein the action associated with the message is configured using the sender account prior to sending the message to the first user account.

17. The computer of claim 14, wherein the computer-readable instructions further cause the computer to perform:
   receiving an automated out of office reply from the second user account;
   in response to receiving the automated out of office reply from the second user account:
      transmitting the message to a third user account on the predetermined escalation list;
      restricting the second user account from performing the action associated with the message; and
      authorizing the third user account to perform the action for the second predetermined amount of time.

18. The computer of claim 13, wherein the action associated with the message comprises sending a response in the email application to the message sent using the sender account to the first user account.

19. The computer of claim 13, wherein the computer-readable instructions further cause the computer to perform, prior to transmitting the message to the second user account:
   in response to determining that the message is unanswered for the first predetermined amount of time:
      transmitting a reminder message to the first user account that the message is unanswered for the first predetermined amount of time.

20. A non-transitory computer-readable medium having instructions stored thereon that are executable by a computing system to perform operations comprising:
   determining that a first user account of an email application has not performed an action associated with a message for a first predetermined amount of time, wherein the first predetermined amount of time is configured using a sender account prior to sending the message to the first user account; and
   in response to determining that the first user account has not performed the action associated with the message for the first predetermined amount of time:
      transmitting the message to a second user account of the email application on a predetermined escalation list, wherein the predetermined escalation list is configured using the sender account prior to sending the message to the first user account; and
      authorizing the second user account for a second predetermined amount of time to send a response to the message in the email application, wherein the second predetermined amount of time is configured using the sender account prior to sending the message to the first user account.

* * * * *